(12) United States Patent
Han et al.

(10) Patent No.: US 10,461,287 B2
(45) Date of Patent: Oct. 29, 2019

(54) BATTERY PACK

(71) Applicant: SAMSUNG SDI CO., LTD., Yongin-si, Gyeonggi-do (KR)

(72) Inventors: Jung-Yup Han, Yongin-si (KR); No-Hyun Kwag, Yongin-si (KR)

(73) Assignee: Samsung SDI Co., Ltd., Gyeonggi-do (KR)

(*) Notice: Subject to any disclaimer, the term of this patent is extended or adjusted under 35 U.S.C. 154(b) by 90 days.

(21) Appl. No.: 14/805,249

(22) Filed: Jul. 21, 2015

(65) Prior Publication Data

US 2015/0325825 A1  Nov. 12, 2015

Related U.S. Application Data

(62) Division of application No. 12/898,379, filed on Oct. 5, 2010.

(30) Foreign Application Priority Data

Dec. 11, 2009 (KR) .................... 10-2009-0123377

(51) Int. Cl.
*H01M 2/10* (2006.01)
*H01M 2/20* (2006.01)

(52) U.S. Cl.
CPC ......... *H01M 2/1016* (2013.01); *H01M 2/105* (2013.01); *H01M 2/1022* (2013.01); *H01M 2/1077* (2013.01); *H01M 2/202* (2013.01); *H01M 2/204* (2013.01); *H01M 2/206* (2013.01)

(58) Field of Classification Search
CPC .. H01M 2/1016; H01M 2/105; H01M 2/1022; H01M 2/202; H01M 2/204
See application file for complete search history.

(56) References Cited

U.S. PATENT DOCUMENTS

| | | | |
|---|---|---|---|
| 6,627,345 B1* | 9/2003 | Zemlok | H01M 2/1055 429/158 |
| 7,764,496 B2* | 7/2010 | Nguyen | H01G 2/08 361/697 |
| 2007/0122692 A1* | 5/2007 | Smith | H01M 2/0202 429/87 |
| 2009/0181288 A1* | 7/2009 | Sato | H01M 2/1077 429/57 |

(Continued)

FOREIGN PATENT DOCUMENTS

| | | |
|---|---|---|
| JP | 2001-325931 A | 5/2000 |
| JP | 2007-280679 A | 4/2006 |

(Continued)

OTHER PUBLICATIONS

Registration Determination Certificate issued by the Korean Intellectual Property Office dated Dec. 9, 2011.

*Primary Examiner* — Jonathan G Jelsma
(74) *Attorney, Agent, or Firm* — Knobbe, Martens, Olson & Bear LLP

(57) ABSTRACT

A battery pack including secondary batteries, and a case accommodating the secondary batteries, the case including: an upper case; a lower case; and plates disposed on each of the upper case and the lower case and each of the plates having holes corresponding to ends of each of the secondary batteries, wherein support protrusions are formed on the holes of the case so as to align the secondary batteries.

9 Claims, 9 Drawing Sheets

(56) References Cited

U.S. PATENT DOCUMENTS

2009/0297892 A1* 12/2009 Ijaz .................. H01M 2/105
                                                                   429/7
2010/0255355 A1* 10/2010 Park ................... H01M 2/105
                                                                   429/91
2011/0135993 A1* 6/2011 An ..................... H01M 2/1077
                                                                   429/156

FOREIGN PATENT DOCUMENTS

| JP | 2008-034296 A | 7/2006 | |
|---|---|---|---|
| KR | 20-0396717 | 9/2005 | |
| WO | WO-2008038916 A1 * | 4/2008 | ............ H01M 2/105 |

\* cited by examiner

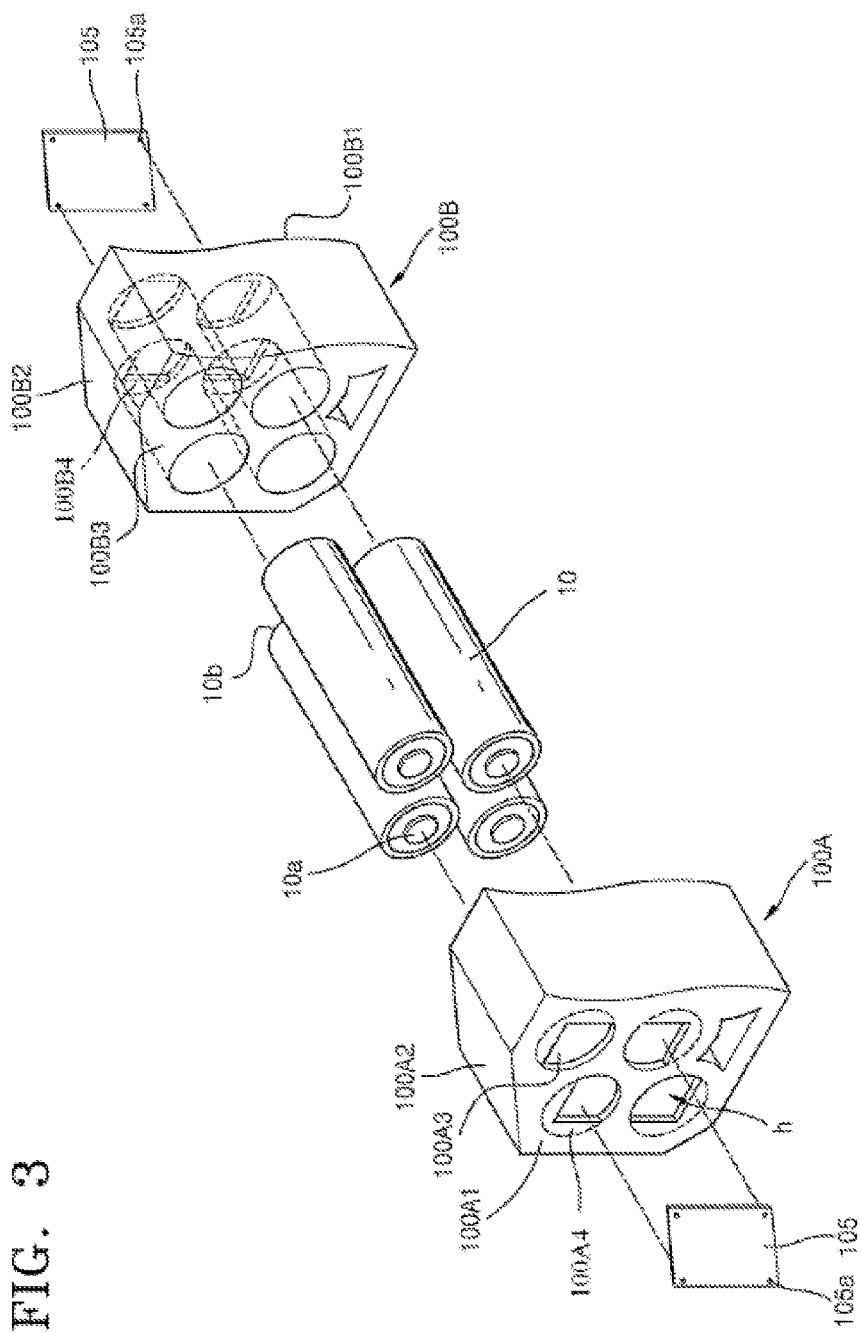

BATTERY PACK

CROSS-REFERENCE TO RELATED APPLICATIONS

This application is a divisional application which claims priority under 35 U.S.C. § 120 from U.S. patent application Ser. No. 12/898,379, filed Oct. 5, 2010, which claims priority to and the benefit of Korean Patent Application No. 10-2009-0123377, filed Dec. 11, 2009, in the Korean Intellectual Property Office, the disclosure of each of which is incorporated herein by reference.

BACKGROUND

Field

Aspects of the present invention relate to a battery pack, and more particularly, to a structure of a battery pack.

Description of the Related Technology

A plurality of batteries are connected in parallel or in series to form a battery pack to supply a greater output voltage and a greater output current compared to an output voltage and an output current supplied by one battery. Thus, a large amount of current may be supplied via the battery pack. The battery pack is used in various applications requiring a large amount of current and voltage. For example, the battery pack including a plurality of connected secondary batteries may be installed in devices such as a power tool, an electric bicycle, an electric scooter, or other similar devices.

SUMMARY OF CERTAIN INVENTIVE ASPECTS

Aspects of the present invention include a battery pack in which secondary batteries are arranged in such a way as to be easily welded to a coupling tap.

According to an aspect of the present invention, a battery pack includes secondary batteries; and a case accommodating the secondary batteries, the case including: an upper case; a lower case; and plates disposed on each of the upper case and the lower case and each of the plates having holes corresponding to ends of each of the secondary batteries, wherein support protrusions are formed on the holes so as to align the secondary batteries.

According to another aspect of the present invention, each of the upper case and the lower case may include side walls formed as side surfaces of the upper case and the lower case, respectively, and extending in a longitudinal direction of the secondary batteries; and guide rails disposed in the plates and the side walls and guiding and supporting a sliding operation of each of the secondary batteries.

According to another aspect of the present invention, the support protrusions may be formed on a same plane on which the plates are formed, so as to cover at least a portion of respective ones of the holes.

According to another aspect of the present invention, the upper case and the lower case may have symmetrical shapes with respect to each other.

According to another aspect of the present invention, the plate, the side wall, and the guide rails corresponding to the upper case and the lower case may be integrally formed with respect to the upper case and the lower case.

According to another aspect of the present invention, the battery pack may further include a coupling taps coupled to corresponding ones of the secondary batteries through the holes in order to electrically connect corresponding ones of the secondary batteries to each other. A thickness of each of the coupling taps may be equal to or smaller than a thickness of respective ones the plates.

According to another aspect of the present invention, when the coupling taps may be coupled to the secondary batteries, space is formed between an end of respective ones of the guide rails and respective ones of the coupling taps. The battery pack may further include grooves formed in ends of the guide rails so as to correspond to the coupling taps, respectively.

According to another aspect of the present invention, a surface of each of the coupling taps that faces the secondary batteries may be disposed on a plane on which a surface of the support protrusions facing the secondary batteries is disposed.

According to another aspect of the present invention, the support protrusions may be disposed so as not to overlap the coupling taps. The coupling taps may be coupled to corresponding ones of the secondary batteries by welding.

According to another aspect of the present invention, each of the coupling taps include a connection protrusion that contacts the end of corresponding ones of the secondary batteries and is formed to correspond to respective ones of the holes.

According to an aspect of the present invention, a battery pack includes secondary batteries; a case accommodating the secondary batteries, the case including: an upper case; a lower case; and plates disposed on each of the upper case and the lower case and each of the plates having holes corresponding to ends of each of the secondary batteries; and alignment members disposed on a side of the upper case and aligning respective ones of the secondary batteries.

According to another aspect of the present invention, a width of each of the alignment members may be greater than an interval between two adjacent ones of the secondary batteries.

According to another aspect of the present invention, each of the alignment members may cover portions of at least two adjacent holes of the plates.

According to another aspect of the present invention, coupling taps may be coupled to the secondary batteries through the holes in order to electrically connect corresponding ones of the secondary batteries to each other and the alignment members may align locations of corresponding ones of the coupling taps to the upper or lower cases.

According to another aspect of the present invention, a coupling hole may be formed in the coupling taps, respectively, to correspond to the alignment members.

According to another aspect of the present invention, the coupling taps may include nickel.

According to another aspect of the present invention, the shape of the alignment members may be cylindrical.

According to aspects of the present invention, secondary batteries may be aligned for welding by inserting the secondary batteries into a case without any further operations.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a schematic exploded perspective view explaining coupling between a portion of FIG. 1 and a coupling tap, according to an embodiment of the present invention;

DETAILED DESCRIPTION OF CERTAIN INVENTIVE EMBODIMENTS

Figure 1:
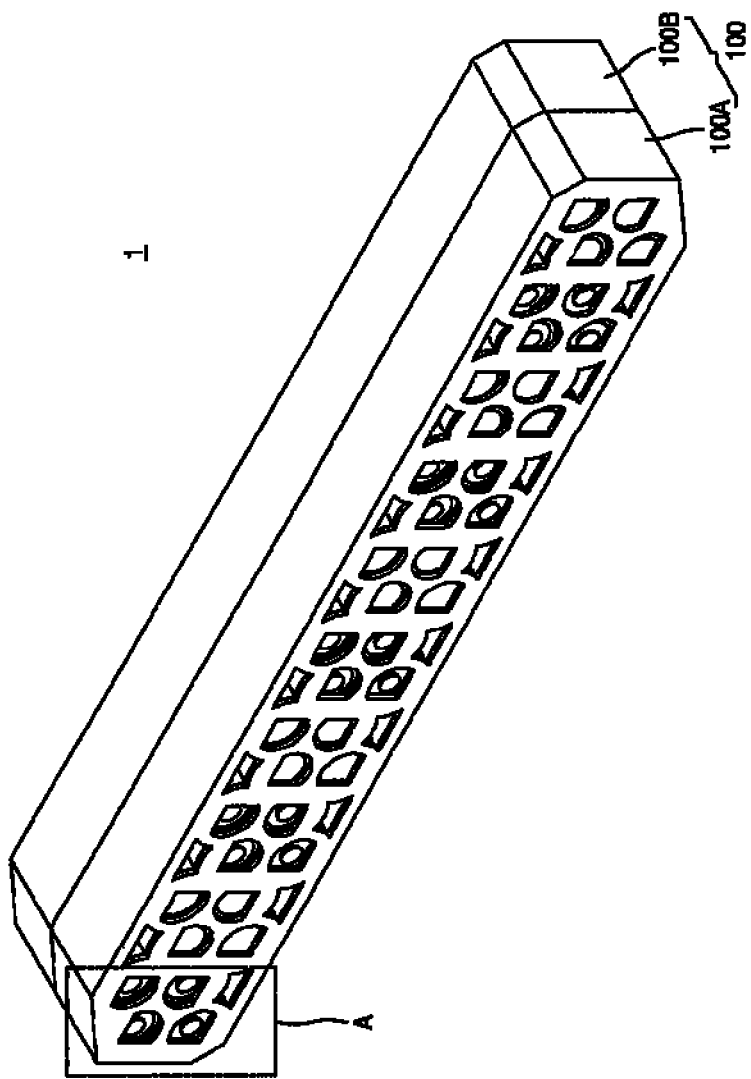
FIG. 1 is a schematic perspective view of a battery pack according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
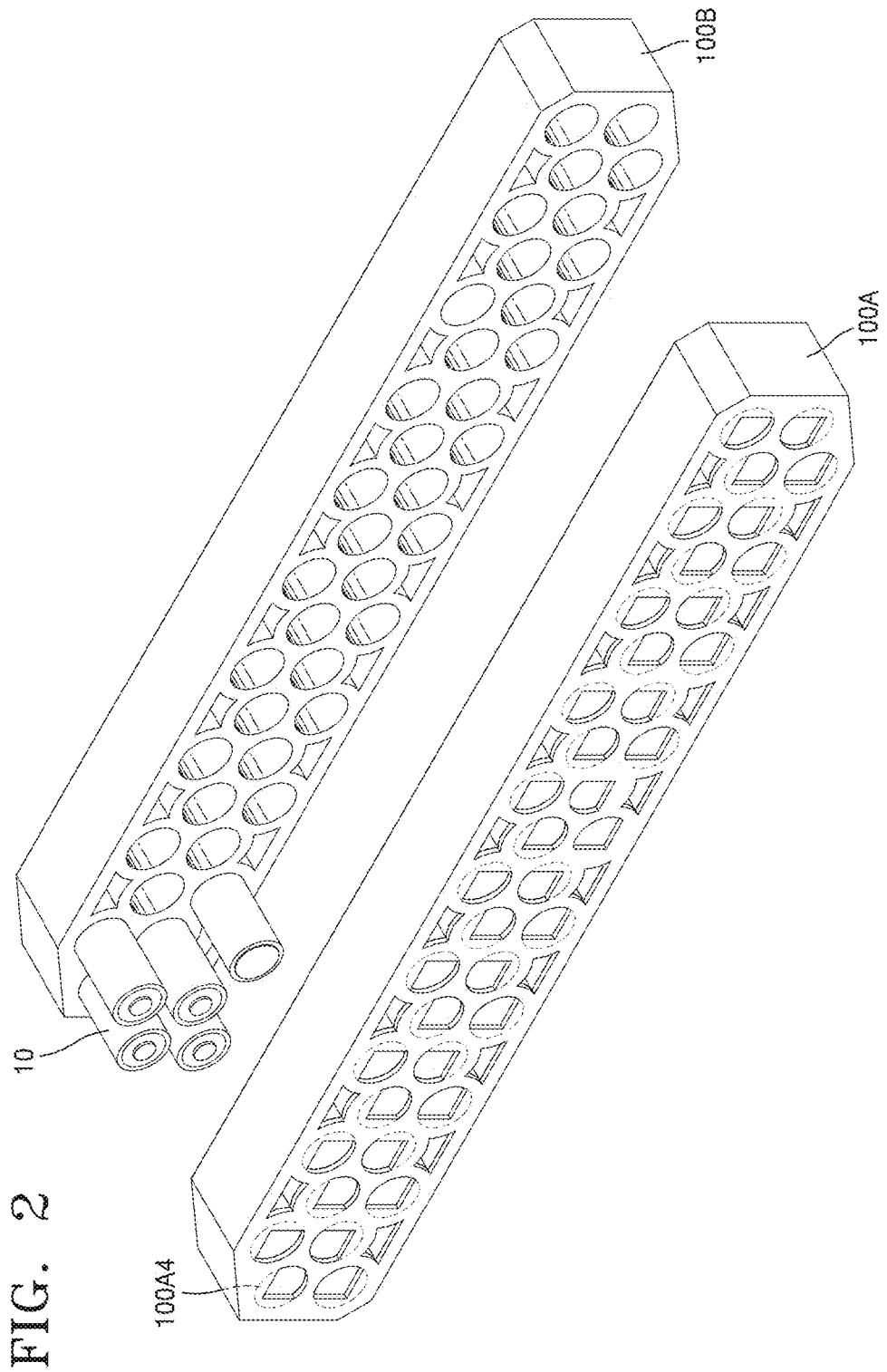
FIG. 2 is a schematic exploded perspective view of the battery pack of FIG. 1, according to an embodiment of the present invention.

FIG. 1 is a schematic perspective view of a battery pack 1 according to an embodiment of the present invention. FIG. 2 is a schematic exploded perspective view of the battery pack 1 of FIG. 1, according to an embodiment of the present invention. FIG. 3 is a schematic exploded perspective view explaining coupling between a portion A of FIG. 1 and a coupling tap 105, according to an embodiment of the present invention. The battery pack 1 will be described with reference to FIGS. 1 through 3.

The battery pack 1 includes secondary batteries 10 and a case 100. A set of the secondary batteries 10 are a chargeable and dischargeable battery assembly. In this instance, the secondary batteries 10 may each be a nickel-cadmium (Ni—Cd) battery, a nickel-hydrogen (Ni-MH) battery, or a lithium (Li) battery. However, aspects of the present invention are not limited thereto, and the secondary batteries 10 may be any suitable type of battery. In particular, a Li battery has an operating voltage about 3 times higher than that of a Ni—Cd battery or a Ni-MH battery and a high energy density by weight, and thus is widely used as a power source of portable electronic devices. The battery pack 1 has an output current and an output voltage greater than any single ones of the secondary batteries 10 by connecting the secondary batteries 10 in series or in parallel. The secondary batteries 10 each have an angular or circular shape. However, aspects of the present invention are not limited thereto, and the secondary batteries 10 may have any suitable shape.

In FIGS. 1 through 3, the secondary batteries 10 each have a circular shape for convenience of description. The secondary batteries 10 each include terminals 10a and 10b at respective ends of each of the secondary batteries 10. However, aspects of the present invention are not limited thereto and the arrangement of the terminals 10a and 10b is not particularly limited. For example, terminals that are to be electrically connected to external elements may be disposed on an end or a side surface of a circular or angular secondary battery.

The case 100 includes an upper case 100A and a lower case 100B. The case 100 accommodates the secondary batteries 10 therein or the secondary batteries 10 are detached from the case 100 by coupling or decoupling the upper case 100A and the lower case 100B, as shown in FIG. 2. The case 100 is formed of a nonconductive material such as plastic. However, aspects of the present invention are not limited thereto and the case 100 may be formed of other suitable nonconductive material. The case 100 is manufactured by shaping a metallic material such as aluminum (Al) into a frame form and then coating a surface of the frame with an insulating material. In this instance, the upper case 100A includes a first plate 100A1, a first side wall 100A2, and a first guide rail 100A3, and the lower case 100B includes a second plate 100B1, a second side wall 100B2, and a second guide rail 100B3. The first plate 100A1, the first side wall 100A2, the first guide rail 100A3, or the second plate 100B1, the second side wall 100B2, and the second guide rail 100B3 are configured as separable components to be coupled or are integrally formed with each other. The upper case 100A and the lower case 100B may have symmetric shapes with respect to each other. However, aspects of the present invention are not limited thereto, and the upper case 100A and the lower case 100B may have other suitable shapes.

Referring to FIG. 3, holes 'h' are formed through the first and second plates 100A1 and 100B1. In this instance, the holes 'h' are formed to correspond to the ends of the secondary batteries 10. Thus, the terminals 10a and 10b of the secondary batteries 10 are electrically connected to external elements through the holes 'h' of the first and second plates 100A1 and 100B1. In addition, the secondary batteries 10 are connected through the holes 'h' in series or in parallel.

The first and second side walls 100A2 and 100B2 are formed as side surfaces of the upper and lower cases 100A and 100B, and extend in a longitudinal direction of the secondary batteries 10. Although not illustrated, the upper case 100A and the lower case 100B are coupled to each other through grooves formed in the first and second side walls 100A2 and 100B2.

The first guide rail 100A3 are disposed in the first plate 100A1 and the second guide rail 100B3 are disposed in the second plate 100B1. The first and second guide rails 100A3 and 100B3 guide and support a sliding operation of the secondary batteries 10. In this instance, the first and second guide rails 100A3 and 100B3 each have an angular or circular shape corresponding to the shape of the secondary batteries 10. Thus, when the secondary batteries 10 are accommodated in the upper and lower cases 100A and 100B, the secondary batteries 10 slide along the first and second guide rails 100A3 and 100B3, each shaped corresponding to the shape of the secondary batteries 10.

Since the upper case 100A includes the first plate 100A1, the first side wall 100A2, and the first guide rail 100A3, and the lower case 100B includes the second plate 100B1, the second side wall 100B2, and the second guide rail 100B3, the upper and lower cases 100A and 100B are coupled to the secondary batteries 10. In order to connect the secondary batteries 10 to each other in series or in parallel, the coupling tap 105 is connected to the terminals 10a and 10b of the secondary batteries 10. In this instance, the coupling tap 105 is connected to the terminals 10a and 10b of the secondary batteries 10 by welding.

In this instance, in order to connect and weld the coupling tap 105 to the secondary batteries 10 inserted in the upper and lower cases 100A and 100B, the terminals 10a and 10b of the secondary batteries 10 need to be aligned and disposed on the same planes. However, when a force is exerted on the secondary batteries 10, the secondary batteries 10 slide out of the upper and lower cases 100A and 100B, and thus, with respect to welding, alignment of the secondary batteries 10 may be lost. Therefore, separate operations need to be performed to align the secondary batteries 10.

In order to overcome this and or other problems, the first and second plates 100A1 and 100B1 include first and second support protrusions 100A4 and 100B4, respectively. The first and second support protrusions 100A4 and 100B4 are formed on planes on which the first and second plates 100A1 and 100B1 are formed, and each cover at least a portion of the holes h. The first and second support protrusions 100A4 and 100B4 support the secondary batteries 10 accommodated in the first and second guide rails 100A3 and 100B3, so as to prevent the secondary batteries 10 from sliding out of the upper and lower cases 100A and 100B through the holes h. In FIG. 3, the first and second support protrusions 100A4 and 100B4 are disposed on the planes on which the first and second plates 100A1 and 100B1 are formed. However, aspects of the present invention are not limited thereto, and the first and second support protrusions 100A4 and 100B4 may be disposed in other suitable manners.

Although not illustrated, the first and second support protrusions 100A4 and 100B4 may protrude from the first and second plates 100A1 and 100B1, respectively, so as to support the secondary batteries 10. Shapes of the first and second support protrusions 100A4 and 100B4 are not limited to shapes shown in FIG. 3. Surfaces of the first and second support protrusions 100A4 and 100B4 face and support the secondary batteries 10. In order to align and connect the secondary batteries 10 to the coupling tap 105, the surfaces of the first and second support protrusions 100A4 and 100B4, which contact the secondary batteries 10, are disposed on the same planes. However, aspects of the present invention are not limited thereto and the first and second support protrusions 100A4 and 100B4 may not be disposed on the same planes according to how the coupling tap 105 is shaped. Rather, the first and second support protrusions 100A4 and 100B4 may be disposed on different planes since the shape of surfaces of the first and second support protrusions 100A4 and 100B4 that contact the secondary batteries 10 correspond to the shape of the coupling tap 105.

Figure 4A:
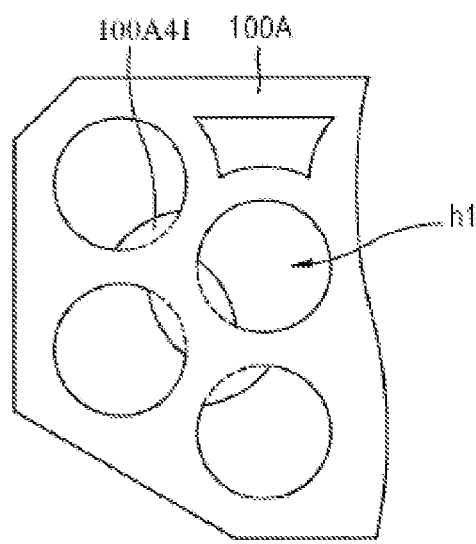
FIG. 4A is a plan view of an upper case, according to an embodiment of the present invention.

The first and second support protrusions 100A4 and 100B4 are formed on the planes on which the first and second plates 100A1 and 100B1 are formed, respectively, so that respective ones of the first and second support protrusions 100A4 and 100B4 cover at least a portion of corresponding ones of the holes h. Hereinafter, various modified examples of shapes of the first and second support protrusions 100A4 and 100B4 will be described with reference to FIGS. 4A through 4D. FIG. 4A is a plan view of the upper case 100A, according to an embodiment of the present invention. Referring to FIG. 4A, a support protrusion 100A41 is formed to be close to an adjacent hole h1, with respect to the hole in which the support protrusion 100A41 is disposed. In this instance, a portion of the upper case 100A extends to form the support protrusion 100A41, as illustrated in FIG. 4A.

Figure 4B:
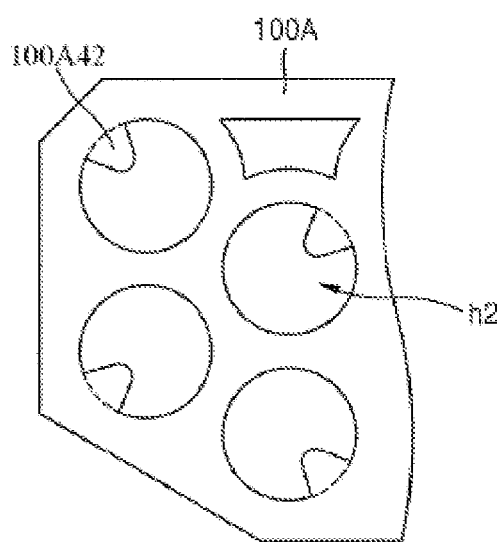
FIG. 4B is a plan view of an upper case, according to another embodiment of the present invention.
Figure 4C:
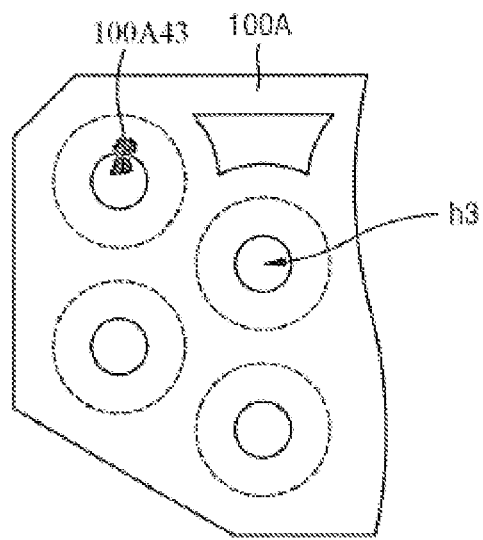
FIG. 4C is a plan view of an upper case, according to another embodiment of the present invention.

Referring to FIG. 4B, a support protrusion 100A42 is randomly formed without any particular rule. Alternatively, referring to FIG. 4C, a support protrusion 100A43 is formed to cover a section of a circumference area of a hole 'h3'. In this instance, the support protrusion 100A43 reduces the hole h3 so that the secondary batteries 10 do not pass through the hole 'h3'. The terminal 10a or 10b of the secondary batteries 10 protrude through the reduced hole 'h3' to be electrically connected to external elements. Alternatively, a connection protrusion (not shown) may be formed on a surface of the coupling tap 105 to correspond to the terminal 10a or 10b of the secondary batteries 10. Thus the connection protrusion may be electrically connected to the terminal 10a or 10b of the secondary batteries 10. However, aspects of the present invention are not limited thereto, and the connection protrusion may be connected in other manners.

The coupling tap 105 includes the connection protrusion that contacts one of the secondary batteries 10 and is formed corresponding to the hole 'h3' so as to be electrically connected to the secondary batteries 10. The connection protrusion that contacts one of the secondary batteries 10 is variously configured as long as the coupling tap 105 is electrically connected to the secondary batteries 10.

Figure 4D:
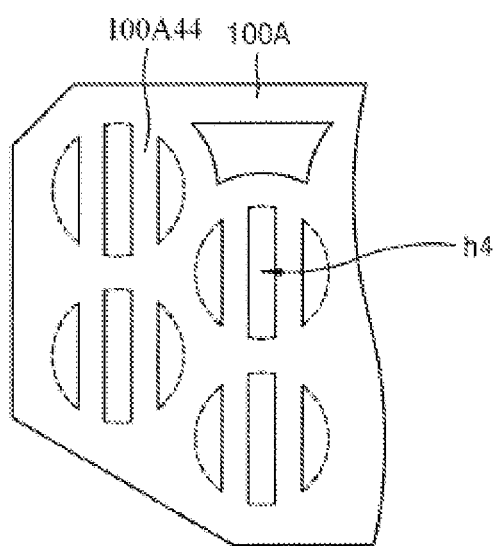
FIG. 4D is a plan view of an upper case, according to another embodiment of the present invention.

Referring to FIG. 4D, a support protrusion 100A44 is formed to cover at least a portion of a hole 'h4'. The terminal 10a or 10b of the secondary battery 10 is electrically connected to the coupling tap 105 (shown in FIG. 3) through the hole h4, which has a reduced open area due to the support protrusion 100A44. Alternatively, a connection protrusion may be formed on a welding portion 105a formed on the coupling tap 105 so as to electrically connect the coupling tap 105 and the secondary batteries 10 to each other.

Figure 5:
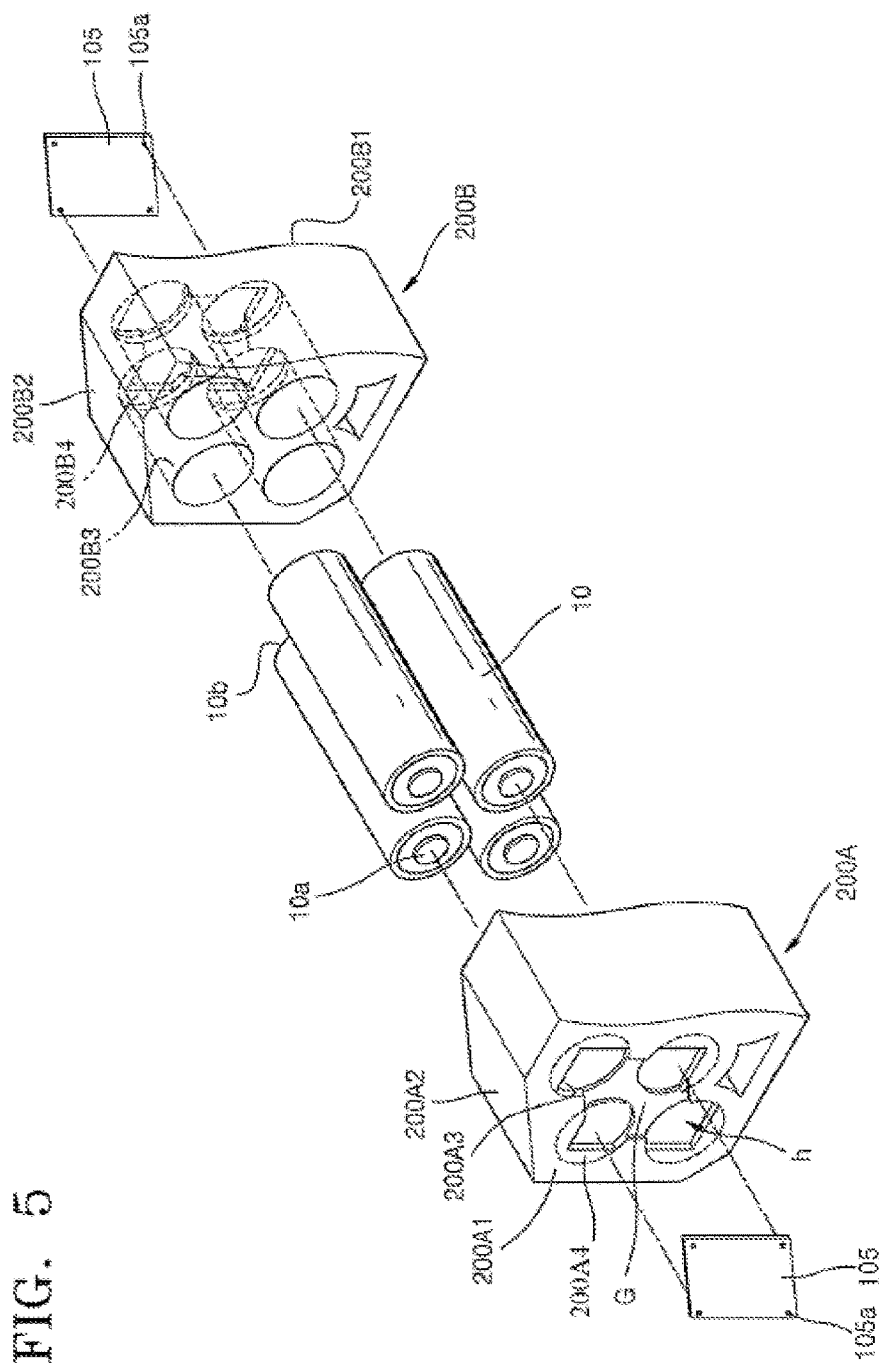
FIG. 5 is a schematic exploded perspective view explaining a modified example of FIG. 3, according to another embodiment of the present invention.
Figure 6:
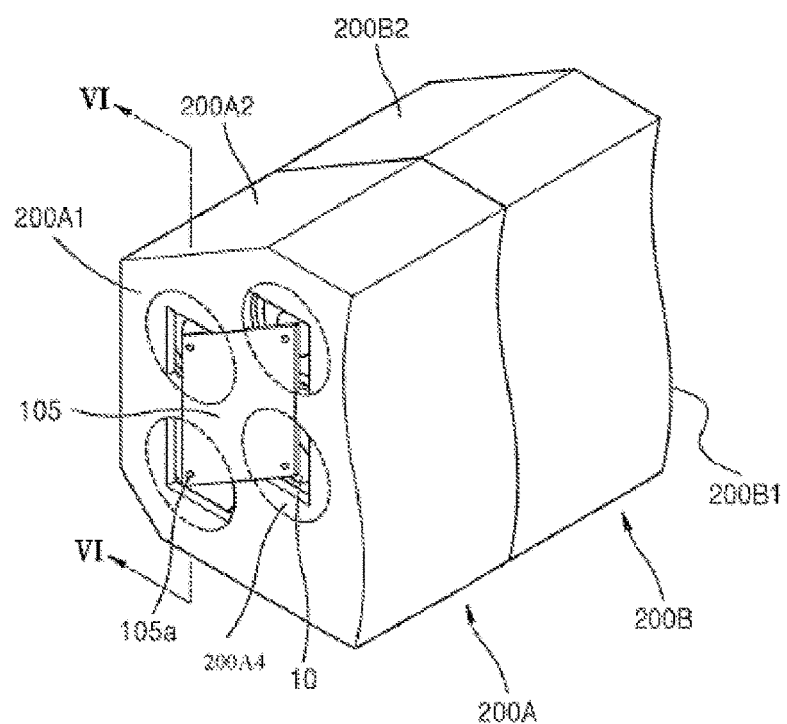
FIG. 6 is a schematic perspective view explaining a case where a coupling operation of FIG. 5 is completed, according to an embodiment of the present invention.
Figure 7:
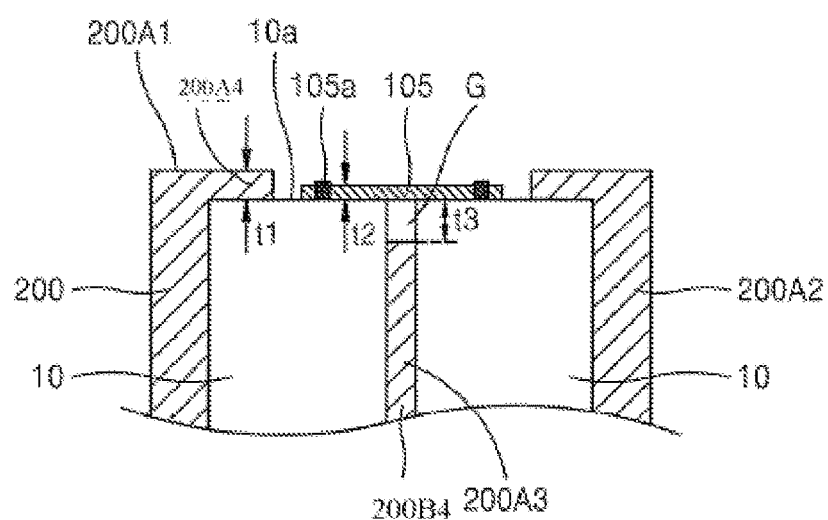
FIG. 7 is a schematic cross-sectional view of a battery pack taken along a line VI-VI' of FIG. 6, according to an embodiment of the present invention.

FIG. 5 is a schematic exploded perspective view explaining a modified example of FIG. 3, according to another embodiment of the present invention. FIG. 6 is a schematic perspective view explaining a case where a coupling operation of FIG. 5 is completed, according to an embodiment of the present invention. FIG. 7 is a schematic cross-sectional view of a battery pack taken along a line VI-VI' of FIG. 6, according to an embodiment of the present invention. Hereinafter, a modified example of FIG. 3 will be described with reference to FIGS. 5 through 7. Referring to FIG. 5, an upper case 200A includes a first plate 200A1, a first side wall 200A2, and a first guide rail 200A3, and a lower case 200B includes a second plate 200B1, a second side wall 200B2, and a second guide rail 200B3. Additionally, the upper case 200A includes a first support portion 200A4 and the lower case 200B includes a second support portion 200B4.

Each of the first and second guide rails 200A3 and 200B3 includes a groove G having a depth t3 and formed between the coupling tap 105 and one end of each of first and second guide rails 200A3 and 200B3, respectively. Thus, the groove G connects the coupling tap 105 and the secondary batteries 10 to each other. That is, the groove 'G' is formed at one end of each of the first and second guide rails 200A3 and 200B3 in an area corresponding to the coupling tap 105. If the groove 'G' is formed in one end of each of the first and second guide rails 200A3 and 200B3, the coupling tap 105 is closely attached to the secondary batteries 10. In other words, the coupling tap 105 is closely attached to ends of the secondary batteries 10 without using support portions from each of the first and second guide rails 200A3 and 200B3, and thus processes such as welding are easily performed.

A thickness 't2 of the coupling tap 105 is equal to or smaller than a thickness 't1 of each of the first and second plates 200A1 and 200B1. Various effects may be obtained by configuring the coupling tap 105 to have the thickness t2 equal to or smaller than the thickness 't1. For example, when the coupling tap 105 is welded to the secondary batteries 10, a welding protrusion is formed on the welding portion 105a. In this instance, a height of the welding protrusion does not exceed each a height of the first and second plates 200A1 and 200B1, thereby preventing the secondary batteries 10 from contacting outside elements. In addition, if the coupling tap 105 is thicker that the first and second plated 200A1 and 200B1, the coupling tap 105 protrudes from each of the first and second plates 200A1 and 200B1 when the coupling tap 105 is coupled to the secondary batteries 10. In this instance, the coupling between the coupling tap 105 and the secondary batteries 10 may contact outside elements and may be broken due to external shocks. However, according to aspects of the present embodiment, the coupling tap 105 is sufficiently and relatively thin, and thus the coupling between the coupling tap 105 and the secondary batteries 10 is be exposed to external shocks.

Figure 8:
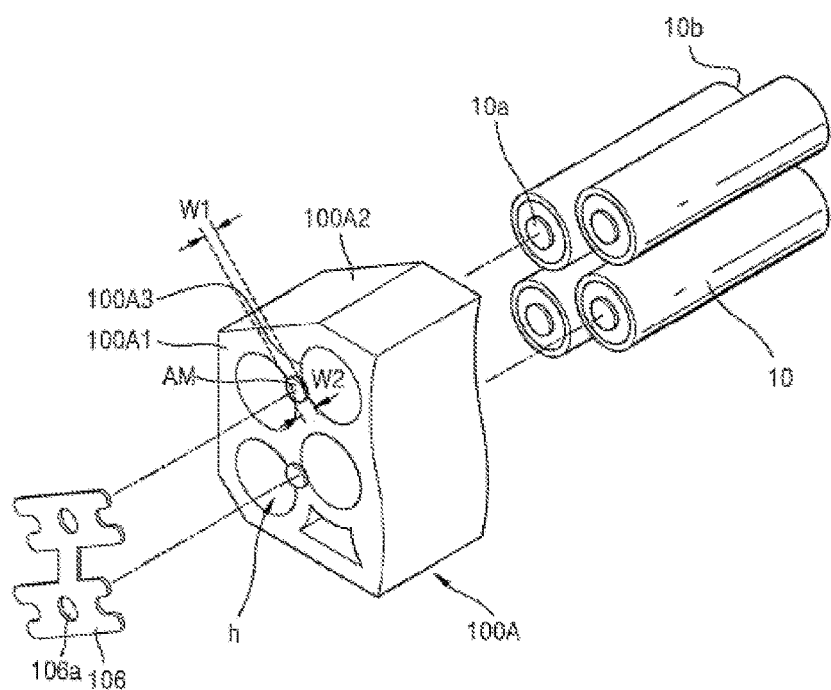
FIG. 8 is a part of schematic exploded perspective view explaining a modified example of FIG. 3, according to another embodiment of the present invention.

FIG. 8 is a schematic exploded perspective view explaining a modified example of FIG. 3, according to another embodiment of the present invention. Referring to FIG. 8, alignment members AM are attached onto the upper or lower cases 100A or 100B to function as support protrusions 100A41. In this instance, the alignment members AM are formed to have a size greater than an interval W1 between the secondary batteries 10. Thus, a width of the alignment members W2 is greater than a width of the interval W1 between the secondary batteries 10. The alignment members AM cover portions of at least two corresponding holes h. Each of the alignment members AM are formed to be larger than the interval between at least two secondary batteries 10 so that the at least two secondary batteries 10 do not slide out of the upper or lower cases 100A or 100B. Thus, the alignment members AM function as the support protrusions 100A41. Since a width of the alignment members W2 is greater than the interval W1 between at least two secondary batteries 10, the alignment members AM prevent the secondary batteries 10 from sliding out of the upper or lower cases 100A or 100B.

The alignment members AM are coupled to the upper or lower cases 100A or 100B via screwing or welding. A coupling tap 106 has a coupling hole 106a therein. Coupling taps 106 are coupled to the upper or lower cases 100A or 100B via the alignment members AM. The alignment members AM are formed to correspond to the location and shape of the coupling holes 106a. The alignment members AM align the coupling taps 106 to the upper or lower cases 100A or 100B, and thus it is easier to weld the coupling taps 106 to the secondary batteries 10. The coupling taps 106 include nickel. The shape of the alignment members AM is cylindrical. However, aspects of the present invention are not limited thereto, and the coupling taps 106 may use other suitable materials, and the shape of the alignment members AM are not be limited thereto and other embodiments may vary the shape of the alignment members AM.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery pack comprising:
   secondary batteries;
   a case accommodating the secondary batteries, the case comprising:
   an upper case;
   a lower case; and
   plates disposed on each of the upper case and the lower case and each of the plates having holes, wherein each hole corresponds to an end of each of a single one of the secondary batteries;
   alignment members attached to the plate of the upper case; and
   a conductive coupling tap,
   wherein each of the alignment members comprises a protrusion covering at least a portion of one or more holes,
   wherein the alignment member is a separate component from the conductive coupling tap
   wherein the conductive coupling tap is configured to electrically couple to the ends of corresponding ones of secondary batteries corresponding to the one or more holes,
   wherein a width of each of the alignment members is greater than an internal interval between two adjacent ones of the secondary batteries, and
   wherein each of the alignment members covers portions of at least two adjacent holes of the plates.

2. The battery pack of claim 1, wherein the coupling tap is configured to electrically couple to the ends of the secondary batteries through the holes in order to electrically connect the corresponding ones of the secondary batteries to each other,
   wherein the alignment members align locations of corresponding ones of the coupling taps to the upper or lower cases.

3. The battery pack of claim 2, wherein coupling holes are formed in the coupling taps, respectively, to correspond to the alignment members.

4. The battery pack of claim 2, wherein the coupling taps comprise nickel.

5. The battery pack of claim 1, wherein the shape of the alignment members is cylindrical.

6. The battery pack of claim 1, further comprising support protrusions that are tabs extending from a circumference of respective ones of the holes.

7. The battery pack of claim 1, further comprising support protrusions that comprise chords of circles formed by the respective ones of the holes.

8. The battery pack of claim 1, further comprising support protrusions that are ring shaped to partially cover respective ones of the holes.

9. The battery pack of claim 1, further comprising support protrusions that comprise a series of lines extending across respective ones of the holes.

* * * * *